US011199802B2

(12) United States Patent
Mori et al.

(10) Patent No.: US 11,199,802 B2
(45) Date of Patent: Dec. 14, 2021

(54) LAYER TRANSFER DEVICE

(71) Applicant: Brother Kogyo Kabushiki Kaisha, Nagoya (JP)

(72) Inventors: Kentaro Mori, Kasugai (JP); Ryosuke Sakai, Nagoya (JP); Seiji Hiramatsu, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/034,848

(22) Filed: Sep. 28, 2020

(65) Prior Publication Data

US 2021/0011418 A1 Jan. 14, 2021

Related U.S. Application Data

(63) Continuation of application No. PCT/JP2019/012036, filed on Mar. 22, 2019.

(30) Foreign Application Priority Data

Mar. 28, 2018 (JP) .............................. JP2018-061696

(51) Int. Cl.
*G03G 15/20* (2006.01)
*G03G 15/00* (2006.01)

(52) U.S. Cl.
CPC ......... *G03G 15/6585* (2013.01); *G03G 15/20* (2013.01); *G03G 15/2028* (2013.01); *G03G 15/2053* (2013.01)

(58) Field of Classification Search
CPC ........... G03G 15/2028; G03G 15/2053; G03G 15/6585; G03G 15/20
See application file for complete search history.

(56) References Cited

U.S. PATENT DOCUMENTS 8,417,171 B2 * 4/2013 Christopher ....... G03G 15/6585
399/341
8,632,934 B2 * 1/2014 Shirai ................ G03G 15/2064
430/126.1
(Continued)

FOREIGN PATENT DOCUMENTS

CN   103832083 A   6/2014
CN   106256552 A   12/2016
(Continued)

OTHER PUBLICATIONS

Jun. 4, 2020—International Search Report—Intl App PCT/JP2019/012036.
(Continued)

*Primary Examiner* — Hoang X Ngo
(74) *Attorney, Agent, or Firm* — Banner & Witcoff, Ltd.

(57) ABSTRACT

A layer transfer device configured to transfer at least one layer of a multilayer film onto a toner image includes: a sheet conveying unit; a supply reel; a wind-up reel; a film transfer unit; and a peeling roller disposed between the film transfer unit and the wind-up reel in a conveyance path and configured to peel off the multilayer film from a sheet, and the film transfer unit includes: a first roller provided to contact the sheet; and a second roller provided to contact the multilayer film, and a tangent line of the second roller at a downstream end of a nip part passes between a center of the second roller and a center of the peeling roller, and an angle formed by the tangent line and a film tension portion of the multilayer film tensed between the nip part and the peeling roller is 15 to 37 degrees.

12 Claims, 5 Drawing Sheets

(56) References Cited

U.S. PATENT DOCUMENTS

| | | | |
|---|---|---|---|
| 8,957,929 B2 | 2/2015 | Sakai et al. | |
| 10,029,480 B2 | 7/2018 | Aihara et al. | |
| 10,434,795 B2 | 10/2019 | Aihara et al. | |
| 2010/0104336 A1 | 4/2010 | Christopher et al. | |
| 2010/0212821 A1* | 8/2010 | Grinberg | B32B 37/0046 156/247 |
| 2012/0251174 A1* | 10/2012 | Shirai | G03G 15/6585 399/132 |
| 2014/0132697 A1 | 5/2014 | Sakai et al. | |
| 2017/0368813 A1 | 12/2017 | Grimault et al. | |

FOREIGN PATENT DOCUMENTS

| | | |
|---|---|---|
| JP | S62-261463 A | 11/1987 |
| JP | 2013-121709 A | 6/2013 |
| JP | 2017-223734 A | 12/2017 |

OTHER PUBLICATIONS

Sep. 29, 2020—(WO) IPRP—App PCT/JP2019/012036.
Sep. 22, 2021—(CN) Notification of the First Office Action—App 201980022015.9.
Oct. 21, 2021—(EP) Extended Search Report—App 19777786.5.

* cited by examiner

LAYER TRANSFER DEVICE

CROSS-REFERENCE TO RELATED APPLICATION

This is a continuation application of International Application No. PCT/JP2019/012036 filed on Mar. 22, 2019 which claims priority from Japanese Patent Application No. 2018-061696 filed on Mar. 28, 2018. The entire contents of the earlier applications are incorporated herein by reference.

TECHNICAL FIELD

Aspects of the disclosure relates to a layer transfer device that overlaps a multilayer film having a plurality of layers with a surface of a sheet on which a toner image is formed, and that transfers at least one layer of the multilayer film onto the toner image.

BACKGROUND

In the related art, there is known a layer transfer device that includes a supply reel around which a multilayer film is wound and a wind-up reel that winds up the multilayer film from the supply reel. In a state where a sheet conveyed from a sheet conveying unit is overlapped with the multilayer film supplied from the supply reel, the layer transfer device transfers a transfer layer onto a toner image of the sheet.

In such a layer transfer device, after the sheet and the multilayer film are caused to pass a nip part of a heating roller and a pressing roller and to perform thermal transfer in a state where the sheet and the multilayer film are overlapped each other, the sheet and the multilayer film are conveyed along a direction of a tangent line of the heating roller at a downstream end of the nip part in a conveying direction. Further, when the multilayer film passes a peeling roller provided on the tangent line of the heating roller, the multilayer film which has been thermal transferred is peeled off from the sheet and is wound by the wind-up reel.

The sheet which passes the nip part of the heating roller and the pressing roller and which is conveyed in a tangent line direction tends to curl to conform to a shape of the heating roller. When the sheet curls, the sheet is to be partially peeled off from a contact surface shared with the multilayer film before reaching the peeling roller.

When such a force is applied before the sheet reaches the peeling roller, the transfer layer which is softened due to heating in the vicinity of the toner image may be pulled by the sheet and adhere to the sheet. As a result, an excess transfer layer is transferred around the toner image, so that so-called burrs may be generated, the transfer layer may be excessively transferred with respect to the toner image, and the transfer layer may be insufficient with respect to the toner image.

SUMMARY

An object of the present disclosure is to provide a layer transfer device capable of preventing action of a force of peeling a sheet from a multilayer film when the sheet passes from a nip part of a heating roller and a pressing roller to a peeling roller, and capable of transferring a transfer layer onto a toner image without causing excess or deficiency in a transfer portion.

Disclosed here is a layer transfer device that overlaps a multilayer film having a plurality of layers with a surface of a sheet on which a toner image is formed, the layer transfer device being configured to transfer at least one layer of the multilayer film onto the toner image, the layer transfer device including: a sheet conveying unit configured to convey the sheet; a supply reel around which the multilayer film is wound; a wind-up reel configured to wind up the multilayer film from the supply reel; a film transfer unit configured to perform transfer in a state where the multilayer film supplied from the supply reel is overlapped with the sheet conveyed from the sheet conveying unit; and a peeling roller disposed between the film transfer unit and the wind-up reel in a conveyance path of the multilayer film, the peeling roller contacting the multilayer film having passed the film transfer unit, the peeling roller being configured to peel off the multilayer film from the sheet when a conveying direction of the multilayer film having passed the film transfer unit is changed to a direction different from a conveying direction of the sheet due to the wind-up reel winding up the multilayer film, in which the film transfer unit includes: a first roller provided at a position to contact the sheet; and a second roller provided at a position to contact the multilayer film, and the film transfer unit overlaps the sheet with the multilayer film and is configured to heat and press the sheet and the multilayer film at a nip part of the first roller and the second roller, and a tangent line of the second roller at a downstream end of the nip part in the conveying direction of the sheet passes between a center of the second roller and a center of the peeling roller, and an angle formed by the tangent line and a film tension portion of the multilayer film tensed between the nip part and the peeling roller is 15 degrees to 37 degrees.

BRIEF DESCRIPTION OF DRAWINGS

Aspects of the disclosure are illustrated by way of example and not by limitation in the accompanying figures in which like reference characters indicate similar elements.

DETAILED DESCRIPTION

Embodiments of the present disclosure will be described in detail with reference to an appropriate drawing. In the following description, first, an entire configuration of a foil transfer device is briefly described, and thereafter a peripheral structure of a heating roller and a pressing roller will be described.

Figure 1:
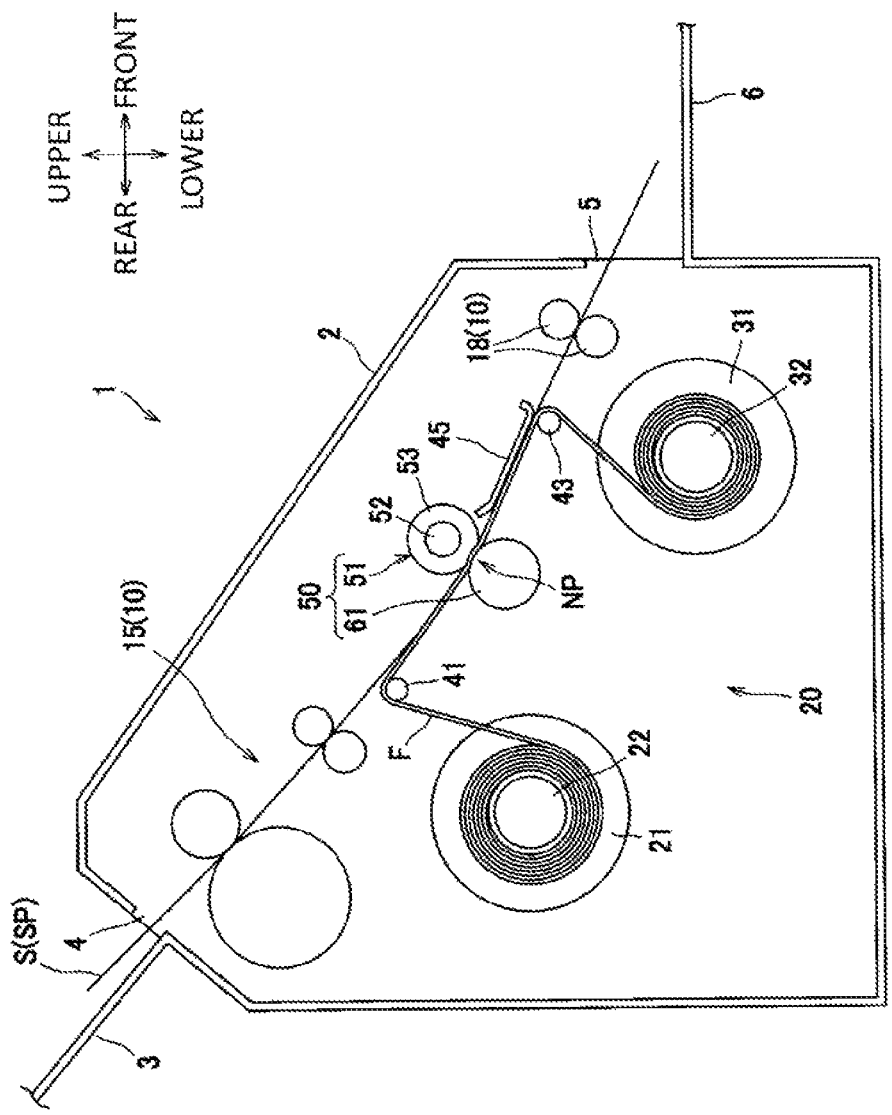
FIG. 1 is a cross-sectional view of a foil transfer device according to an embodiment.

In the following description, directions will be described with directions shown in FIG. 1. That is, a right side of FIG. 1 is set as "front", a left side of FIG. 1 as "rear", a front side of a paper surface of FIG. 1 as "left", and a back side of the paper surface of FIG. 1 as "right". Upper and lower sides of FIG. 1 are set as "upper" and "lower" respectively.

A foil transfer device 1 as an example of a layer transfer device is, for example, a device that, after an image forming apparatus such as a laser printer forms a toner image on a sheet, transfers a foil such as a gold foil onto the toner image of the sheet.

As shown in FIG. 1, the foil transfer device 1 includes a main body housing 2, a sheet tray 3 that is provided at a rear portion of the main body housing 2 and on which a sheet S such as a piece of paper or an OHP film is placed, a sheet supply port 4 through which the sheet S supplied from the sheet tray 3 passes, a sheet discharge port 5 that is provided at a front portion of the main body housing 2, and a sheet discharge tray 6 on which the sheet S discharged through the sheet discharge port 5 is placed.

The main body housing 2 mainly includes, in an inner portion thereof, a sheet conveying unit 10 that conveys the sheet S along a conveyance path SP extending from the sheet supply port 4 to the sheet discharge port 5, a film supply unit 20 that supplies a multilayer film F so as to overlap the multilayer film F with the sheet S conveyed from the sheet conveying unit 10, and a film transfer unit 50 that heats and presses the sheet S and the multilayer film F in a state where the sheet S and the multilayer film F are overlapped each other.

The sheet conveying unit 10 mainly includes a sheet supply mechanism 15 that includes a plurality of pairs of rollers and that conveys the sheet S supplied through the sheet supply port 4 toward the film transfer unit 50, and a pair of conveying rollers 18 that conveys the sheet S which has passed the film transfer unit 50 toward the sheet discharge port 5.

The sheet conveying unit 10 conveys the sheet S placed on the sheet tray 3 one by one toward the film transfer unit 50 by the sheet supply mechanism 15 in a state where a surface (front surface) of the sheet S on which the toner image is formed is directed downward. The sheet conveying unit 10 guides the sheet S which passes the film transfer unit 50 and on which a foil is transferred toward the sheet discharge port 5 by the conveying rollers 18.

The film supply unit 20 includes the multilayer film F, a supply reel 21, a wind-up reel 31, a support roller 41, a peeling roller 43, and a holding member 45.

The multilayer film F has, on a tape-like support layer made of a polymer material, a release layer and a foil layer that serves as a transfer layer. The foil is a thin metal such as gold, silver, copper, or aluminum.

The multilayer film F is mainly made of a polymer material.

The supply reel 21 includes a rotatable supply shaft 22, and the multilayer film F is wound around the supply shaft 22.

The wind-up reel 31 includes a rotatable wind-up shaft 32, and a leading end of the multilayer film F is fixed to the wind-up shaft 32.

The wind-up reel 31 is rotationally driven by a drive part (not shown) provided in the main body housing 2. When the wind-up reel 31 rotates, the multilayer film F wound around the supply reel 21 is drawn out, and the drawn-out multilayer film F is wound around the wind-up shaft 32.

The support roller 41 is disposed downstream of the sheet supply mechanism 15 in a conveying direction of the sheet S and below the conveyance path SP of the sheet S. More specifically, in a conveyance path of the multilayer film F, the support roller 41 is disposed upstream of the film transfer unit 50 and between the supply reel 21 and the wind-up reel 31.

The support roller 41 is a roller that guides the multilayer film F supplied from the supply reel 21 with the transfer layer directed upward so as to overlap with the sheet S conveyed from the sheet supply mechanism 15 with the toner image directed downward. The support roller 41 changes a conveying direction of the multilayer film F drawn out from the supply reel 21 and guides the multilayer film F to be substantially parallel to the conveyance path SP of the sheet S.

The peeling roller 43 is disposed downstream of the film transfer unit 50 in the conveying direction of the sheet S and below the conveyance path SP of the sheet S. More specifically, in the conveyance path of the multilayer film F, the peeling roller 43 is disposed downstream of the film transfer unit 50 and between the supply reel 21 and the wind-up reel 31. The peeling roller 43 is a roller that contacts the multilayer film F having passed the film transfer unit 50, and that changes the conveying direction of the multilayer film F having passed the film transfer unit 50 to a direction different from the conveyance path SP of the sheet S due to the wind-up reel 31 winding up the multilayer film F.

The multilayer film F which passes the film transfer unit 50 and which is conveyed in a state of being overlapped with the sheet S is guided in a direction different from a direction of the sheet S when passing the peeling roller 43, and is peeled off from the sheet S.

The holding member 45 is disposed downstream of the film transfer unit 50 in the conveying direction of the sheet S and at a position facing the peeling roller 43 above the conveyance path SP of the sheet S.

The holding member 45 sandwiches the sheet S and the multilayer film F with the peeling roller 43.

The film transfer unit 50 includes a pressing roller 51 serving as an example of a first roller and a heating roller 61 serving as an example of a second roller. The film transfer unit 50 overlaps the sheet S and the multilayer film F with each other, and heats and presses the sheet S and the multilayer film F at a nip part NP of the pressing roller 51 and the heating roller 61.

The pressing roller 51 is disposed above the conveyance path SP of the sheet S and at a position to contact a back surface of the sheet S (a surface opposite the surface formed with the toner image).

The pressing roller 51 is a roller in which a cylindrical core metal 52 provided at a center portion thereof is covered with a rubber layer 53 made of silicone rubber. The rubber layer 53 has JIS-A hardness of 20° to 60°, and a thickness of the rubber layer 53 is 3.0 mm to 8.0 mm. The pressing roller 51 has a diameter of 20 mm to 40 mm. The JIS-A hardness conforms to ISO 7619-2004.

Both end portions of the pressing roller 51 are rotatably supported by the main body housing 2, and the pressing roller 51 is rotationally driven by a motor (not shown). When the pressing roller 51 is pressed against the heating roller 61, the sheet S and the multilayer film F are held between the pressing roller 51 and the heating roller 61, and the heating roller 61 is rotated by rotation of the pressing roller 51.

The heating roller 61 is disposed below the conveyance path SP of the sheet S and at a position to contact the multilayer film F.

The heating roller 61 is a roller in which a heater (not shown) is disposed inside a metal tube formed in a cylindrical shape. The heating roller 61 has a diameter of 20 mm to 40 mm. The heating roller 61 is a rigid body having no rubber layer.

The pressing roller 51 has lower hardness than the heating roller 61, and in a state where the pressing roller 51 is pressed against the heating roller 61, a surface of the pressing roller 51 is recessed with respect to the heating roller 61. Therefore, the nip part NP of the pressing roller 51 and the heating roller 61 has a circular arc shape by the recessed pressing roller 51.

A rubber layer made of silicone rubber can be provided on a surface of the heating roller 61. In this case, the rubber layer 53 of the pressing roller 51 has JIS-A hardness of 20° to 60° and the rubber layer of the heating roller 61 has JIS-A hardness of 5° to 30°, so that the hardness of the pressing roller 51 is relatively lower than the hardness of the heating roller 61.

A thickness of the rubber layer of the heating roller 61 and the thickness of the rubber layer 53 of the pressing roller 51 are 3.0 mm to 8.0 mm.

In the foil transfer device 1 configured as described above, the sheet S which is placed on the sheet tray 3 with the front surface thereof directed downward is conveyed one by one toward the film transfer unit 50 by the sheet supply mechanism 15.

Upstream the film transfer unit 50, the sheet S conveyed along the conveyance path SP of the sheet S is overlapped with the multilayer film F supplied from the supply reel 21 along the conveyance path of the multilayer film F, and is conveyed to the film transfer unit 50 in a state where the toner image of the sheet S and the transfer layer of the multilayer film F are in contact with each other.

In the film transfer unit 50, when the sheet S and the multilayer film F pass the nip part NP of the pressing roller 51 and the heating roller 61, the sheet S and the multilayer film F are heated and pressed by the heating roller 61 and the pressing roller 51, and the foil is thermally transferred onto the toner image.

After the foil is thermally transferred, the sheet S and the multilayer film F are conveyed to the peeling roller 43 in a state of being in close contact with each other. When the sheet S and the multilayer film F pass the peeling roller 43, the conveying direction of the multilayer film F is changed to a direction different from the conveying direction of the sheet S, and thus the multilayer film F is peeled off from the sheet S.

The multilayer film F peeled off from the sheet S is wound around the wind-up shaft 32 of the wind-up reel 31. Meanwhile, the sheet S from which the multilayer film F is peeled off is conveyed toward a nip part of the conveying rollers 18.

Further, the sheet S having passed the conveying rollers 18 is discharged from the sheet discharge port 5 to the sheet discharge tray 6 in a state where the front surface on which the foil is transferred is directed downward.

Next, a configuration on a downstream side of the film transfer unit 50 will be described, which is a characteristic of the present disclosure.

Figure 2:
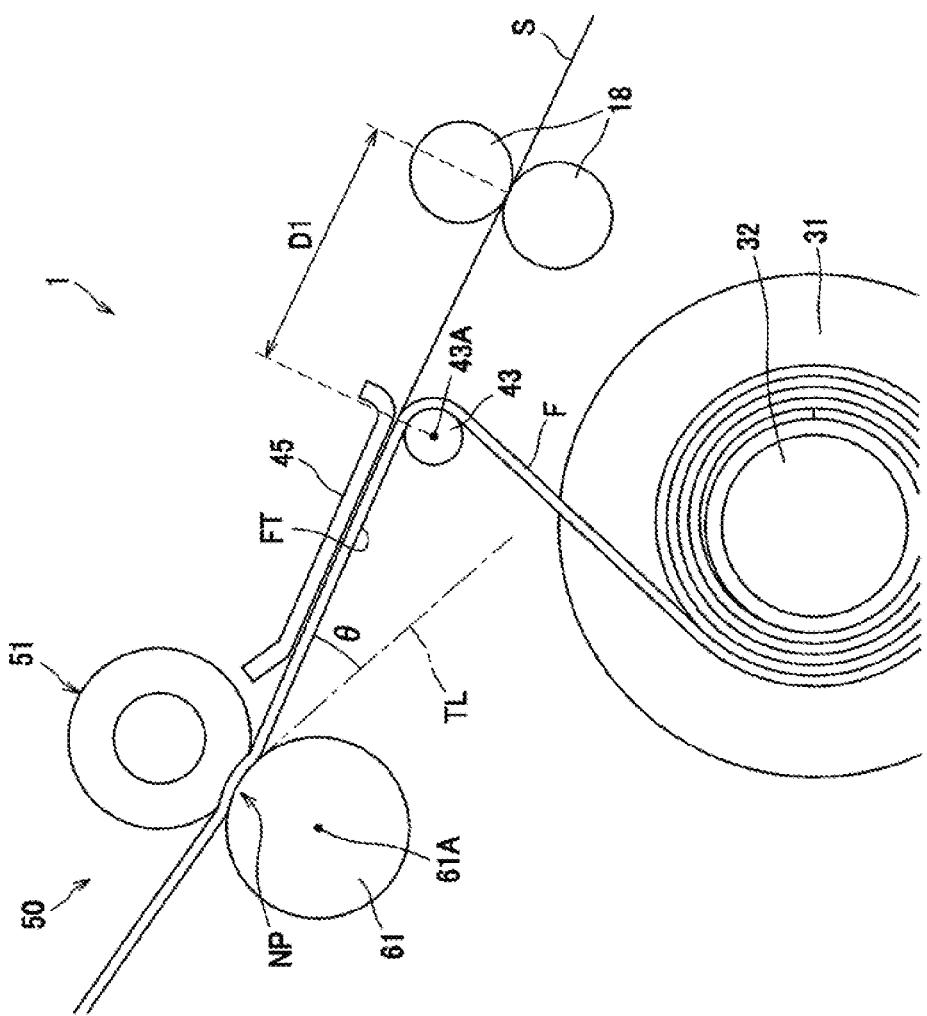
FIG. 2 is an enlarged view of a main part of the foil transfer device of FIG. 1, illustrating a peripheral structure of a heating roller and a pressing roller.

As shown in FIG. 2, the peeling roller 43 is disposed upward than a tangent line TL passing through the nip part NP of the pressing roller 51 and the heating roller 61. More specifically, the tangent line TL of the heating roller 61 at a downstream end of the nip part NP of the pressing roller 51 and the heating roller 61 in the conveying direction of the sheet S passes between a rotation center 61A of the heating roller 61 and a rotation center 43A of the peeling roller 43.

Further, a film tension portion FT of the multilayer film F conveyed along the conveyance path of the multilayer film F is tensed between the nip part NP and the peeling roller 43, and forms an angle θ with the tangent line TL. The angle θ formed by the tangent line TL and the film tension portion FT is set within a predetermined range.

the peeling roller 43 is disposed such that the film tension portion FT is located upward than the tangent line TL, so that the sheet S, which passes the nip part NP of the pressing roller 51 and the heating roller 61 and is heated and pressed and is about to curl along a shape of the heating roller 61, can be corrected by the multilayer film F in the vicinity of an exit of the nip part NP.

The holding member 45 sandwiches the sheet S, of which the curl is corrected, with the film tension portion FT and guides the sheet S. The sheet S and the multilayer film F which are in close contact with each other after passing the film transfer unit 50 are guided along the holding member 45, and thus are conveyed to the peeling roller 43 in a state of being in close contact with each other without occurrence that a force acts to peel off the sheet S from the multilayer film F before the sheet S reaches the peeling roller 43; meanwhile, the transfer layer softened by heating is sufficiently cooled.

The holding member 45 prevents the leading end of the sheet S, from which the multilayer film F is peeled off by passing the peeling roller 43, from floating in a direction of separating from the peeling roller 43, and also plays a role of suppressing vibration of the sheet S caused by the peeling.

The conveying rollers 18 rotate at a peripheral speed larger than a peripheral speed of the pressing roller 51.

The conveying rollers 18 can be disposed at a position such that a distance from the holding member 45 to the nip part of the conveying rollers 18 is equal to or larger than a distance (hereinafter, referred to as "leading end margin length") from the leading end of the sheet S to be conveyed to a leading end of a range (image forming region) where an image forming apparatus is capable of forming the toner image on the sheet S. More specifically, the conveying rollers 18 can be spaced apart from the peeling roller 43 such that a distance D1 from a position, where the sheet S and the multilayer film F are sandwiched by a leading end portion of the holding member 45 and the peeling roller 43, to the nip part of the conveying rollers 18 is equal to or larger than the leading end margin length of the sheet S.

In the foil transfer device 1 configured as described above, the curl of the sheet S having passed the film transfer unit 50 is corrected in the vicinity of the exit of the nip part NP of the pressing roller 51 and the heating roller 61, and thereafter the sheet S is guided by the film tension portion FT and the holding member 45 and is conveyed in a state of being in close contact with the multilayer film F. Therefore, a force acts to peel off the sheet S from the multilayer film F before the sheet S reaches the peeling roller 43, and while the sheet S moves from the nip part NP to the peeling roller 43, the transfer layer of the multilayer film F is sufficiently cooled in a state of being in close contact with the toner image of the sheet S. Accordingly, the foil can be reliably transferred onto the toner image.

Thereafter, the leading end of the sheet S from which the multilayer film F is peeled off by passing the peeling roller 43 is conveyed toward the nip part of the conveying rollers 18.

Further, since the peripheral speed of the conveying roller 18 is larger than the peripheral speed of the pressing roller 51, the sheet S of which the leading end reaches the conveying roller 18 is conveyed in a state where tension is applied to the sheet S between the nip part NP and the nip part of the conveying rollers 18. Meanwhile, since the multilayer film F which passes the peeling roller 43 and which is to be peeled off from the sheet S is peeled off from the sheet S that is in a state where tension is applied to the sheet S, the multilayer film F can be peeled off cleanly.

Next, a reason for determining the predetermined range of the angle θ formed by the film tension portion FT and the tangent line TL (experimental result) will be described.

The inventors of the present application conducted an experiment in which an angle θ, which is formed by a tangent line of a heating roller at a downstream end of a nip part of a pressing roller and the heating roller in a conveying direction of paper and a film tension portion of a multilayer film tensed between the nip part and a peeling roller, was variously changed to determine an angle range of θ at which generation of burrs in a transfer portion could be prevented and good image quality could be obtained.

Paper used in the experiment was Neenah Paper Exact Index (manufactured by Neenah Paper) with a basis weight of 199 g/m². In a foil transfer device used in the experiment, diameters of a pressing roller and a heating roller are both 25 mm, and a thickness of a rubber layer of the pressing roller is 5.5 mm. Measurement was performed in an environment with a temperature of 25° C. and a humidity of 30%.

Specifically, a curl amount (input curl amount) of the paper at a time when a toner image was formed by a laser printer was measured, and then another curl amount (output curl amount) of the paper after a foil was transferred thereto by the foil transfer device was measured. Further, a paper curl ratio defined by output curl amount/input curl amount was determined.

When the paper curl ratio is larger than 1, it means that the curl amount of the paper is increased after the paper passes the film transfer unit of the foil transfer device.

The measurement of the curl amount was performed as follows:

(1) Wait for 1 minute after feeding the paper.
(2) Place the paper on a horizontal table and bring a center of the paper into contact with the table so that four corners of the paper float from the table.
(3) Use a ruler to measure a distance from the corner of the paper to the horizontal table for all four corners.
(4) Repeat (1) to (3) for 3 sheets of paper.
(5) Calculate an average value of the distances from the corners of the paper to the horizontal table, that is, an average value for 4 (points)×3 (sheets)=12 (points).
(6) Repeat (1) to (5) for each angle θ.

In addition, for paper on which a toner image was formed by the laser printer, area of the toner image was measured as pre-print area, and area of the foil transferred onto the toner image by the foil transfer device was measured as foil transfer area. Further, a foil transfer ratio defined by foil transfer area/pre-print area was calculated.

When the foil transfer ratio is large, it means that the area of the foil transferred is larger with respect to the area of the toner image. That is, an excess foil is transferred around the toner image, indicating that a so-called burr has occurred. The foil transfer ratio being at a value close to 1 means image quality that there are few burrs and that edges are sharp in a transfer portion.

Figure 3:
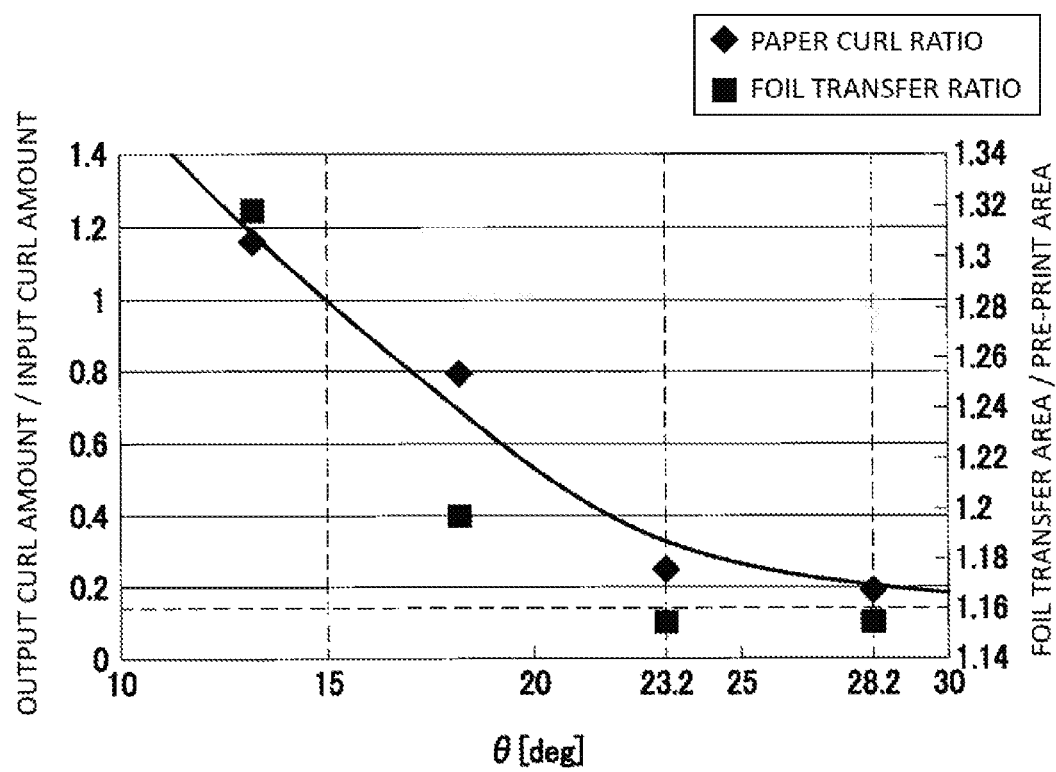
FIG. 3 is a graph showing results of an experiment conducted using the foil transfer device.

The paper curl ratio and the foil transfer ratio described above were determined while changing the angle θ formed by the tangent line and the film tension portion. FIG. 3 is a graph in which the output curl amount/input curl amount is taken on a vertical axis, the angle θ formed by the tangent line and the film tension portion is taken on a horizontal axis, and the paper curl ratio and the foil transfer ratio are plotted.

As a limit of the configuration of the foil transfer device, θ needs to be set to 37 degrees or less.

Referring to FIG. 3, it was confirmed that, with the angle θ formed by the tangent line and the film tension portion being at 15 degrees or more, the paper curl ratio was 1 or less and the value of the foil transfer ratio also fell within an allowable range.

Further, it was confirmed that, with θ being in a range of 23.2 degrees to 28.2 degrees, the paper curl ratio was sufficiently small and the curl of the paper was greatly corrected. At this time, the value of the foil transfer ratio was also 1.16 or less, and image quality that there were few burrs and that edges were sharp in the transfer portion could be obtained.

The paper used in the foil transfer device is preferably thick paper such as the above-described Neenah Paper Exact Index (manufactured by Neenah Paper) with a basis weight of 199 g/m² or Mondi Color Copy (manufactured by Mondi) with a basis weight of 300 g/m².

According to the above, the following effects can be obtained in the present embodiment.

When the peeling roller 43 is disposed such that the tangent line TL of the heating roller 61 passes between the rotation center 61A of the heating roller 61 and the rotation center 43A of the peeling roller 43, and the angle formed by the tangent line TL and the film tension portion FT is 15 degrees to 37 degrees, the sheet S which is heated and pressed at the nip part NP of the pressing roller 51 and the heating roller 61 and which is about to curl along the shape of the heating roller 61 can be corrected by the film tension portion FT in the vicinity of the exit of the nip part NP.

Therefore, when moving from the nip part NP to the peeling roller 43, the sheet S overlapped with the multilayer film F is in close contact with the multilayer film F and the peeling is not performed, and after the foil thermally transferred at the nip part NP is sufficiently cooled, the multilayer film F is peeled off from the sheet S by the peeling roller 43. Therefore, image quality that edges are sharp and that burrs are few in a transfer portion can be obtained. In other words, the foil is transferred to a portion on the sheet S where the toner image is formed and the foil is not transferred to a portion on the sheet S where the toner image is not formed, and accordingly there is no excess transfer layer on the edge portion of the toner image and a good image quality can be obtained.

Further, when the angle formed by the tangent line TL and the film tension portion FT is 23.2 degrees to 28.2 degrees, image quality that edges are cleaner in the transfer portion can be obtained.

The pressing roller 51 has lower hardness than the heating roller 61, and the surface of the pressing roller 51 is recessed with respect to the heating roller 61 in the nip part NP so that the nip part NP has a circular arc shape. Accordingly, the conveyance path SP of the sheet S can be curved. Therefore, members close to the pressing roller 51 and the heating roller 61 can be laid out in proximity to the pressing roller 51 and the heating roller 61, and thus a size of the foil transfer device 1 can be reduced.

Since the pair of conveying rollers 18 that convey the sheet S is disposed downstream of the peeling roller 43 in the conveying direction of the sheet S and the peripheral speed of the conveying rollers 18 is larger than the peripheral speed of the pressing roller 51, the sheet S can be conveyed in a state where tension is applied to the sheet S between the nip part NP and the nip part of the conveying rollers 18. Therefore, at the time of peeling the multilayer film F off from the sheet S by the peeling roller 43, the peeling can be performed cleanly. As a result, image quality that the edges are cleaner in the transfer portion can be obtained.

By providing the holding member 45 which sandwiches the sheet S and the multilayer film F with the peeling roller 43, the leading end of the sheet S from which the multilayer film F has been peeled by passing the peeling roller 43 can be prevented from floating in a direction away from the peeling roller 43, and vibration of the sheet S due to peeling can be suppressed.

Further, since the conveying roller 18 can be disposed at a position spaced apart by a distance equal to or larger than the leading end margin length of the sheet S to be conveyed, the degree of freedom in the layout of the foil transfer device 1 can be increased.

Next, a second embodiment of the present disclosure will be described.

In the following description, the same components as those of the above-described embodiment are denoted by the same reference numerals, and a detailed description thereof is omitted.

Figure 4:
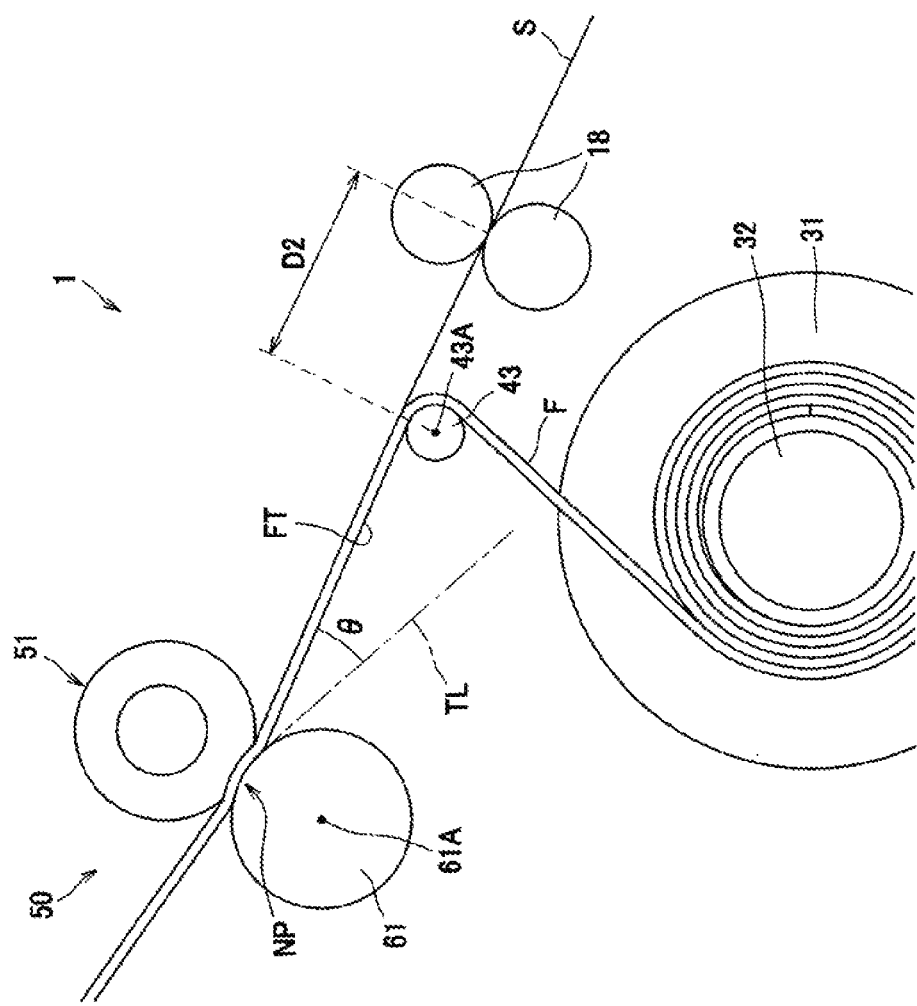
FIG. 4 is an illustrative view of a foil transfer device according to a modification.

As shown in FIG. 4, in the foil transfer device 1 according to a second embodiment, the holding member is not provided at a position facing the peeling roller 43, and a distance D2 from the peeling roller 43 to the nip part of the conveying rollers 18 is less than the leading end margin length of the sheet S.

According to such a foil transfer device, since the distance D2 from the peeling roller 43 to the nip part of the conveying rollers 18 is less than the leading end margin length of the sheet, the multilayer film F is peeled off from the image forming region of the sheet S after the leading end of the sheet S is nipped by the nip part of the conveying rollers 18. Therefore, image quality that the edges are cleaner can be obtained.

Although the embodiments of the present disclosure have been described above, the present disclosure is not limited to these embodiments. The specific configurations may be appropriately modified without departing from the spirit of the present disclosure.

For example, although the foil transfer device has been described as a stand-alone device in the embodiments described above, the foil transfer device can be configured as an optional product of an image forming apparatus, or can be configured as a foil transfer unit attached to the image forming apparatus.

Figure 5:
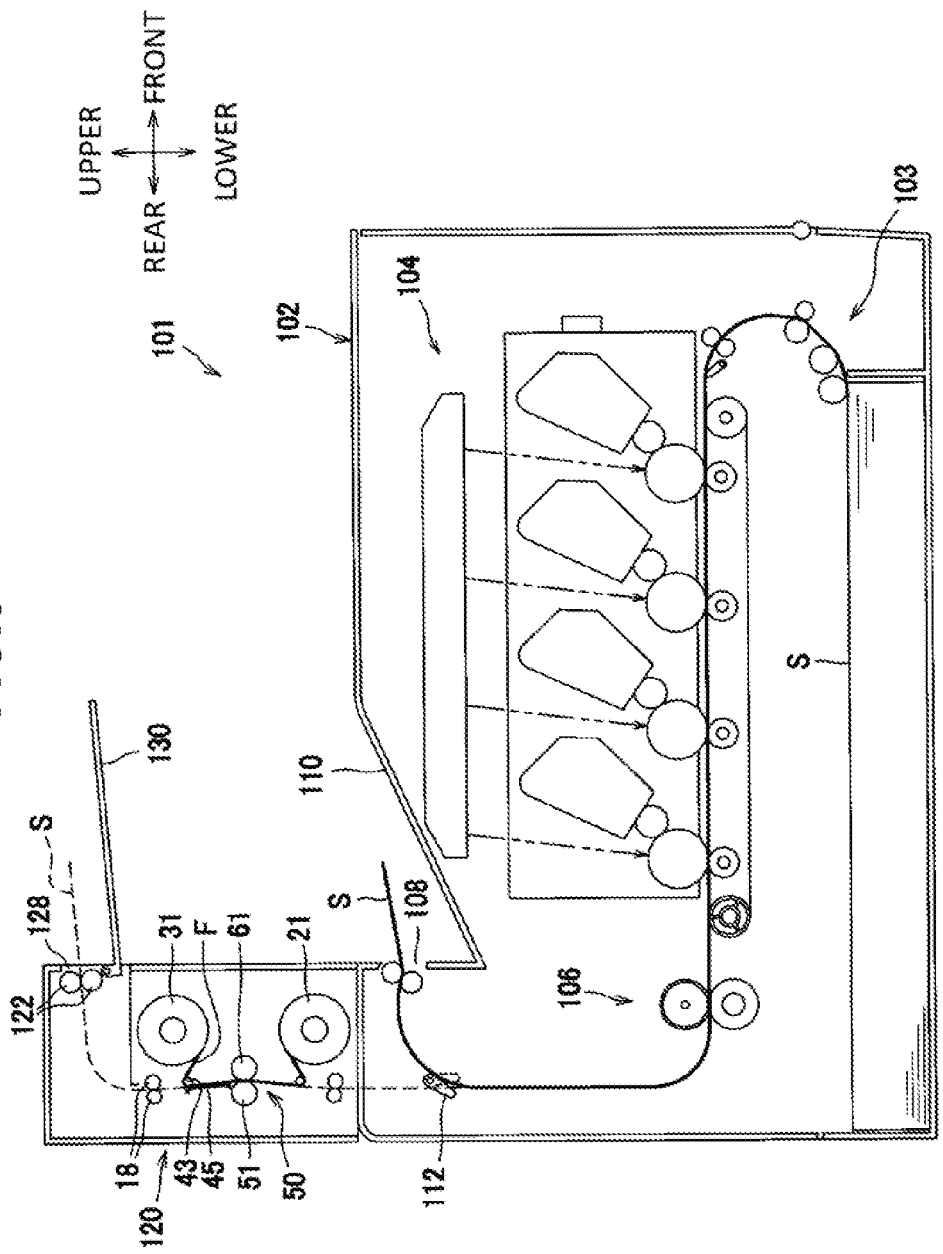
FIG. 5 is a cross-sectional view of a laser printer to which the foil transfer device as an optional product is mounted.

FIG. 5 shows a configuration in which a foil transfer device serving as an example of a layer transfer device is mounted on a color laser printer serving as an example of an image forming apparatus.

In the following description, directions will be described with directions shown in FIG. 5. That is, a right side of FIG. 5 is set as "front", a left side of FIG. 5 as "rear", a front side of the paper surface of FIG. 5 as "left", and a back side of the paper surface of FIG. 5 as "right". Upper and lower sides of FIG. 5 are set as "upper" and "lower" respectively.

As shown in FIG. 5, a color laser printer 101 mainly includes a paper feeding unit 103 and an image forming unit 104 in a housing 102. A foil transfer device 120 serving as an optional product is mounted to an upper portion on a rear side of the housing 102.

The foil transfer device 120 has a configuration similar to that of the foil transfer device 1 shown in FIG. 1.

In the color laser printer 101, the sheet S supplied from the paper feeding unit 103 is conveyed one by one to the image forming unit 104, and a toner image is formed on a front surface of the sheet S in the image forming unit 104. The sheet S on which the toner image is formed is conveyed to a fixing device 106, with its front surface being directed upward, and the toner image is thermally fixed to the sheet S when the sheet S passes the fixing device 106. Thereafter, the sheet S is discharged onto a first sheet discharge tray 110 through a first sheet discharge port 108 of the housing 102, in a state where the front surface on which the toner image is thermally fixed is directed downward.

At this time, a flapper 112 is switched to a position indicated by a solid line, and the sheet S is guided toward the first sheet discharge port 108 by a front face of the flapper 112.

When a foil is transferred to the toner image of the sheet S, the sheet S is conveyed toward the foil transfer device 120 by switching the position of the flapper 112 to a position indicated by a broken line.

The sheet S having passed the fixing device 106 passes over a back face of the flapper 112, and passes the film transfer unit 50 of the foil transfer device 120 in a state where its front surface on which the toner image is thermally fixed is overlapped with the multilayer film F supplied from the supply reel 21. When the toner image of the sheet S passes the pressing roller 51 and the heating roller 61 of the film transfer unit 50, the front surface on which the toner image is thermally fixed by the fixing device 106 melts and the foil is thermally transferred.

The sheet S on which the foil is thermally transferred is conveyed toward the conveying rollers 18, and the multilayer film F after the foil being thermally transferred is wound around the wind-up reel 31 via the peeling roller 43.

Thereafter, the sheet S is discharged onto a second sheet discharge tray 130 through a second sheet discharge port 128 by the pair of conveying rollers 18 and a pair of second conveying rollers 122 in a state where the front surface on which the foil is thermally fixed is directed downward.

The foil transfer device 120 can have a configuration similar to that of the foil transfer device shown in FIG. 4 without a holding member.

According to the foil transfer device 120 of the color laser printer 101, the same effects as those of the foil transfer devices in the embodiments described above can be obtained.

In the above-described embodiments and modification, the film transfer unit 50 includes the pressing roller 51 as a first roller provided at a position to contact the sheet S and a heating roller 61 as a second roller provided at a position to contact the multilayer film F, and alternatively, the film transfer unit can be configured to include a heating roller as a first roller provided at a position to contact the sheet S and a pressing roller as a second roller provided at a position to contact the multilayer film F.

In this configuration, when the heating roller has lower hardness than the pressing roller and is pressed against the pressing roller, a surface of the heating roller is recessed with respect to the pressing roller, and accordingly a nip part has a circular arc shape.

In addition, in the above-described embodiment, instead of the holding member 45, a roller that sandwiches the sheet S and the multilayer film F with the peeling roller 43 can be provided.

Elements described in the embodiments and the modification described above can be optionally combined and implemented.

What is claimed is:

1. A layer transfer device that overlaps a multilayer film having a plurality of layers with a surface of a sheet on which a toner image is formed, the layer transfer device being configured to transfer at least one layer of the multilayer film onto the toner image, the layer transfer device comprising:
 a sheet conveying unit configured to convey the sheet;
 a supply reel around which the multilayer film is wound;

a wind-up reel configured to wind up the multilayer film from the supply reel;

a film transfer unit configured to perform transfer in a state where the multilayer film supplied from the supply reel is overlapped with the sheet conveyed from the sheet conveying unit; and a peeling roller disposed between the film transfer unit and the wind-up reel in a conveyance path of the multilayer film, the peeling roller contacting the multilayer film having passed the film transfer unit, the peeling roller being configured to peel off the multilayer film from the sheet when a conveying direction of the multilayer film having passed the film transfer unit is changed to a direction different from a conveying direction of the sheet due to the wind-up reel winding up the multilayer film, wherein the film transfer unit includes: a first roller provided at a position to contact the sheet; and a second roller provided at a position to contact the multilayer film, and the film transfer unit overlaps the sheet with the multilayer film and is configured to heat and press the sheet and the multilayer film at a nip part of the first roller and the second roller, and wherein a tangent line of the second roller at a downstream end of the nip part in the conveying direction of the sheet passes between a center of the second roller and a center of the peeling roller, and an angle formed by the tangent line and a film tension portion of the multilayer film tensed between the nip part and the peeling roller is 15 degrees to 37 degrees.

2. The layer transfer device according to claim 1,
wherein the first roller has lower hardness than the second roller, and
wherein a surface of the first roller is recessed with respect to the second roller at the nip part so that the nip part has a circular arc shape.

3. The layer transfer device according to claim 2,
wherein the first roller has a rubber layer on the surface of the first roller, and the second roller is a rigid body having no rubber layer, and
wherein the rubber layer of the first roller has JIS-A hardness of 20° to 60°.

4. The layer transfer device according to claim 3,
wherein the rubber layer is made of silicone rubber.

5. The layer transfer device according to claim 2,
wherein each of the first roller and the second roller has a rubber layer on respective surfaces,
wherein the rubber layer of the first roller has JIS-A hardness of 20° to 60°, and
wherein the rubber layer of the second roller has JIS-A hardness of 5° to 30°.

6. The layer transfer device according to claim 5,
wherein the rubber layer is made of silicone rubber.

7. The layer transfer device according to claim 1,
wherein the angle formed by the tangent line and the film tension portion is 23.2 degrees to 28.2 degrees.

8. The layer transfer device according to claim 1,
wherein the first roller is a pressing roller, and
wherein the second roller is a heating roller.

9. The layer transfer device according to claim 1,
wherein the first roller is configured to be driven, and
wherein the second roller is configured to be rotated by rotation of the first roller.

10. The layer transfer device according to claim 1,
wherein a pair of conveying rollers configured to convey the sheet is disposed downstream of the peeling roller, and
wherein a peripheral speed of the conveying rollers is larger than a peripheral speed of the first roller.

11. An image forming apparatus comprising:
the layer transfer device according to claim 10; and
an image forming unit configured to form the toner image on the sheet,
wherein the layer transfer device includes a holding member sandwiching the sheet and the multilayer film with the peeling roller, and
wherein a distance from the holding member to a nip part of the conveying rollers is equal to or larger than a distance from a leading end of the sheet to a leading end of a range where the image forming unit is capable of forming the toner image on the sheet.

12. An image forming apparatus comprising:
the layer transfer device according to claim 10; and
an image forming unit configured to form the toner image on the sheet,
wherein a distance from the peeling roller to a nip part of the conveying rollers is less than a distance from a leading end of the sheet to a leading end of a range where the image forming unit is capable of forming the toner image on the sheet.

* * * * *